J. JOHNSTON.
Smut Machine.
No. 4,264.
Patented Nov. 8, 1845.
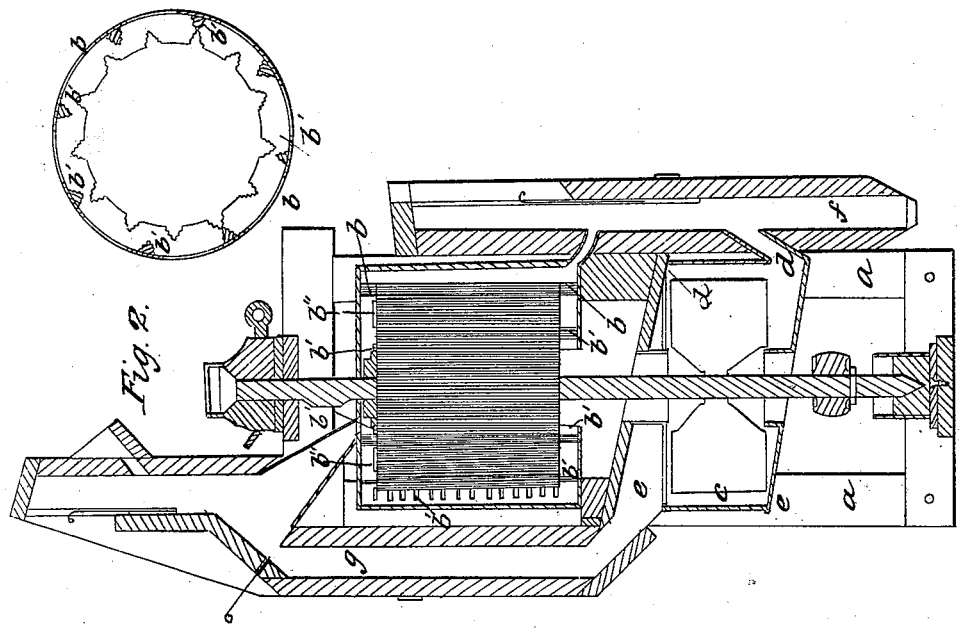
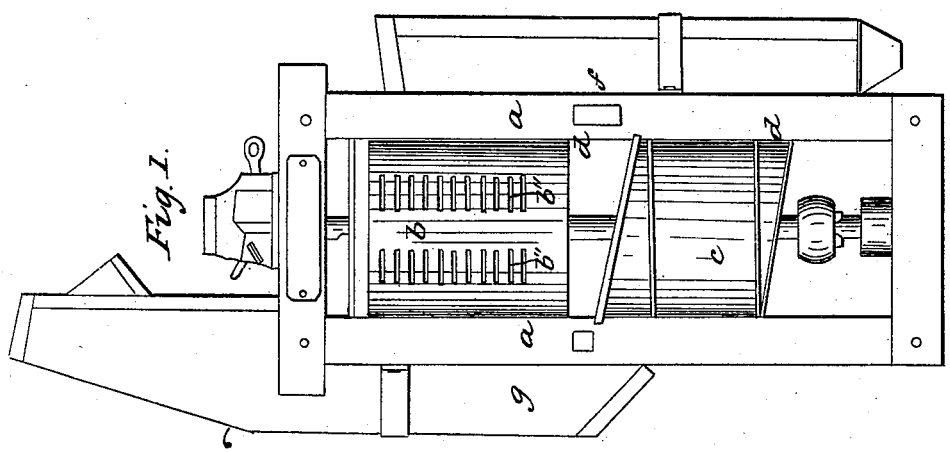

UNITED STATES PATENT OFFICE.

JOSEPH JOHNSTON, OF WILMINGTON, DELAWARE.

SMUT-MACHINE.

Specification of Letters Patent No. 4,264, dated November 9, 1845; Antedated September 9, 1845.

*To all whom it may concern:*

Be it known that I, JOSEPH JOHNSTON, of Wilmington, in the county of Newcastle and State of Delaware, have invented a new and useful Improvement in Smut-Machines; and I do hereby declare that the following is a full, clear, and exact description of the principle or character thereof and what distinguishes it from all other things before known and of the manner of making, constructing, and using the same, reference being had to the accompanying drawings forming part of this specification, in which—

Figure 1 is a side elevation, and Fig. 2 a section through the fan and spouts.

The same letters indicate like parts in both figures.

The nature of my improvement consists in the construction of the fan and its combination with the machine, by which compactness, and a more perfect draft is secured and the combination of the rebounding ribs and close cylinder.

The construction is as follows: A frame, (*a*), composed of four upright posts with proper cross ties supports the apparatus; in the upper part of this frame the concave (*b*) is fixed in which the cylinder runs. The cylinder is tight and composed of staves with projections on its periphery running from top to bottom; the face of the cylinder and also the ribs are fluted, as shown in Fig. 2; on the inside of the concave are projecting ribs (*b'*) between the rows of holes (*b''*) made therein, these are fluted like the cylinder and are for the grain to act against and cause it to rebound toward the cylinder. The shaft of the cylinder extends down below the concave and through the fan case (*c*) that is situated below; this case is of peculiar construction, the cylinder which forms it being cut off obliquely at both ends, and having each of the heads in a plane of the same inclination; one side of which (*d'* or *e'*) nearly approaches the side of the wing of the fan, and the other (*d* or *e*) sets off from the opposite wing; on this side the spout of each is fixed, and these are placed on the opposite sides of the fan case, the lower one (*d*) receiving wind from one side of the case, and the upper one (*e*) from the opposite side; these enter the upright spouts *f*, and *g*, flush with the outer edge of the fan. By this construction larger fans can be used in a given space, and a more efficient and compact arrangement made, the eduction pipe (*f*) being lengthened and the upper pipe (*g*) being made shorter, both of common construction; by this means of constructing the blower a greater effect is produced with a given means than by any other form; the whole can be brought within the frame, and is less liable to be injured by transportation.

The wings of the fan are straight, and fill the space in the cylinder between the oblique ends; the centers of these ends are open as in common blowers, and a rim around said holes extends inward as shown in Fig. 2.

The other parts of the machine are similar to those now in common use and require no description, the pipe (*g*) being for the purpose of passing a draft through the grain before it enters the cylinder, and pipe (*f*) for cleaning it after it has passed the cylinder as it leaves the machine.

Having thus fully described my improvement, I wish it to be understood that I do not claim as my invention the close cylinder having projections thereon; nor do I claim constructing the concave with projections from its inner surface; but

What I do claim as my invention and desire to secure by Letters Patent, is—

1. The combination of a close cylinder not admitting air at the end constructed as above set forth, with a concave having vertical projections thereon between the rows of holes in the said concave in the manner and for the purposes herein described, and in contradistinction to an open cylinder with said projections combined.

2. I also claim the fan constructed in the manner described with inclined heads to the case for the purpose described in combination with the smut machine, all arranged as herein set forth.

JOSEPH JOHNSTON.

Witnesses:
J. J. GREENOUGH,
A. P. BROWNE.